United States Patent
Nonaka et al.

(10) Patent No.: US 7,706,693 B2
(45) Date of Patent: Apr. 27, 2010

(54) OPTICALLY TRANSMITTING APPARATUS, OPTICALLY TRANSMITTING SYSTEM AND OPTICALLY TRANSMITTING METHOD

(75) Inventors: Ayumu Nonaka, Fukuoka (JP); Kouji Nekoda, Fukuoka (JP); Atsunori Machida, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 821 days.

(21) Appl. No.: 11/492,063

(22) Filed: Jul. 25, 2006

(65) Prior Publication Data

US 2007/0217792 A1    Sep. 20, 2007

(30) Foreign Application Priority Data

Mar. 17, 2006    (JP)    ............................. 2006-075438

(51) Int. Cl.
*H04B 10/00* (2006.01)

(52) U.S. Cl. .................. 398/155; 398/183; 398/175; 398/135; 398/138; 370/516; 370/535; 370/389

(58) Field of Classification Search ............... 398/155, 398/141, 140, 158, 159, 163, 164, 173, 175, 398/177, 180, 182, 202, 183, 192, 194, 200, 398/208, 214, 58, 59, 79, 25, 26, 27, 33, 398/135, 138, 128, 130; 370/516, 535, 389, 370/541, 474, 480, 484, 503

See application file for complete search history.

(56) References Cited

U.S. PATENT DOCUMENTS

2004/0028408 A1*  2/2004  Cox et al. .................... 398/66
2004/0228636 A1*  11/2004  Pathak et al. ................ 398/155

FOREIGN PATENT DOCUMENTS

JP    09-083562    3/1997

* cited by examiner

*Primary Examiner*—Hanh Phan
(74) *Attorney, Agent, or Firm*—Staas & Halsey LLP (57) ABSTRACT

This provides an optically transmitting apparatus, an optically transmitting system and an optically transmitting method. This receives an optical signal which is configured in accordance with any one frame format among a plurality of frame formats and includes at least a clock signal and a data signal, and performs an optical-electric/electric-optical conversion on the received optical signal, and extracts the clock signal and the data signal, which correspond to the frame format, from the optical-electric converted signal. This correlates and stores an idle code indicative of a block where the actual data is not communicated and the frame format, reads the idle code from the extracted data signal, identifies the frame format corresponding to the read idle code, and executes a transmitting process in accordance with the identified frame format.

15 Claims, 7 Drawing Sheets

```
GbE    : K28.5/D5.6
       : K28.5/D16.2
1GFC   : K28.5/D21.4/D21.5/D21.5
2GFC   : K28.5/D21.4/D21.5/D21.5
ESCON  : K28.5
```

FIG. 5

| | | |
|---|---|---|
| GbE | AutoNegotiation (C1) | :K28.5/D21.5 /DATA SIGN WORD/DATA SIGN WORD |
| | AutoNegotiation (C2) | :K28.5/D2.2 /DATA SIGN WORD/DATA SIGN WORD |
| | SOP | :K27.7 |
| | EOP | :K29.7 |
| | R (CARRIER EXPANSION) | :K23.7 |
| 1GFC/2GFC | SOFc1 | :K28.5/D21.5/D23.0/D23.0 |
| | SOFn3 | :K28.5/D21.5/D22.1/D22.1 |
| | EOFn | :K28.5/D21.4/D21.6/D21.6 |
| | EOFa | :K28.5/D21.4/D21.7/D21.7 |
| | Offline | :K28.5/D21.1/D10.4/D21.2 |
| | R_RDY | :K28.5/D21.4/D10.2/D10.2 |
| | ... | |
| ESCON | SOFc | :K28.1/K28.7 |
| | EOFd | :K28.6/K28.1/K28.1 |
| | Offline | :K28.5/D24.2 |
| | ... | |

FIG. 7 ian application No. 2006-075438 filed in Japan on Mar. 17, 2006, the entire contents of which are hereby incorporated by reference.

OPTICALLY TRANSMITTING APPARATUS, OPTICALLY TRANSMITTING SYSTEM AND OPTICALLY TRANSMITTING METHOD

CROSS-REFERENCE TO RELATED APPLICATIONS

This Nonprovisional application claims priority under 35 U.S.C. §119(a) on Patent Application No. 2006-075438 filed in Japan on Mar. 17, 2006, the entire contents of which are hereby incorporated by reference.

BACKGROUND OF THE INVENTION

The present invention relates to an optically transmitting apparatus, an optically transmitting system and an optically transmitting method, which can receive a plurality of data sequence frame formats by using one port and then identify therein a frame format and consequently carry out a suitable data transmission.

Figure 1:
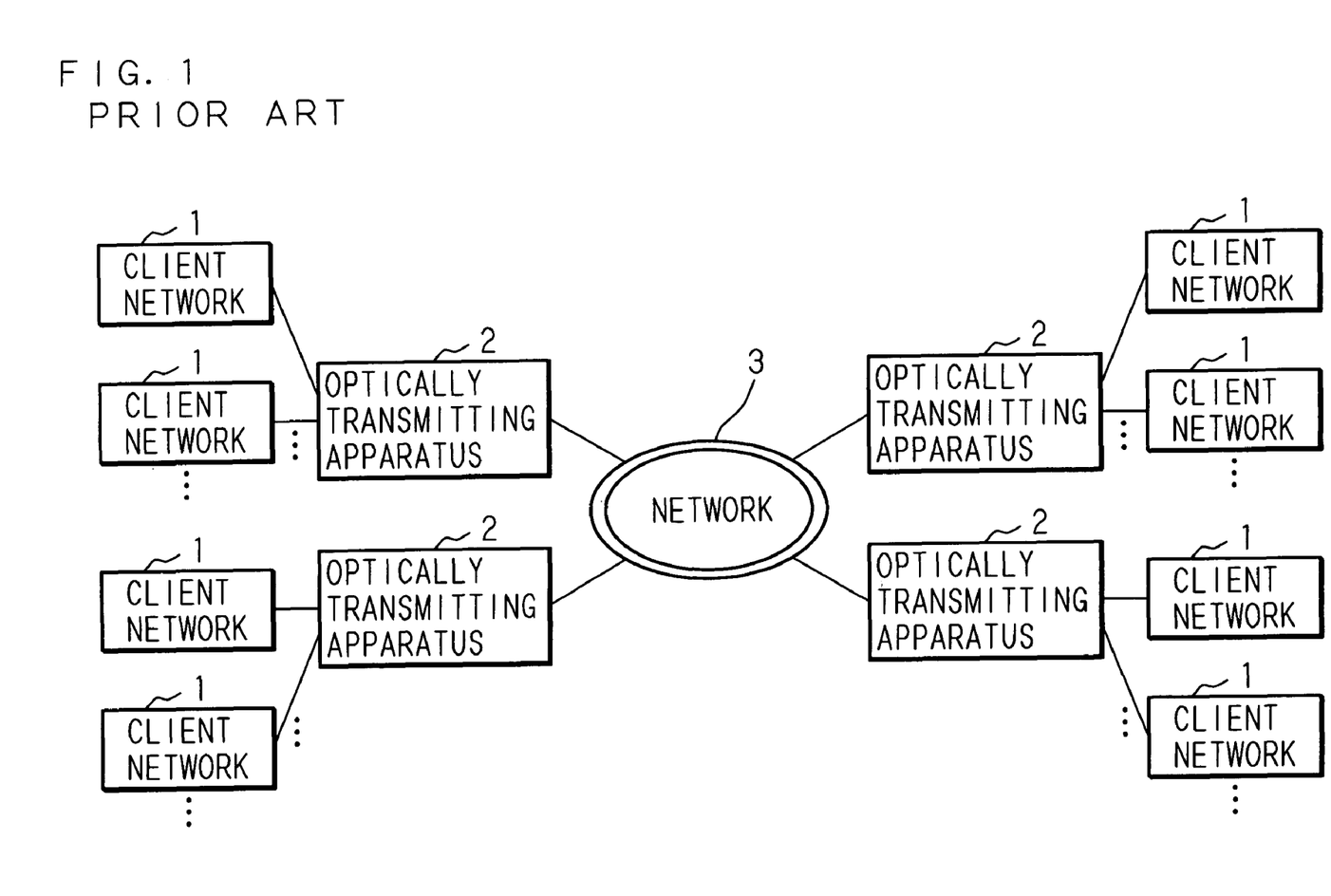
FIG. 1 is a block diagram showing a configuration example of an optically transmitting system.

The optically transmitting system for using an optical signal and carrying out a data transmission at a high speed has been rapidly spread. FIG. 1 is a block diagram showing the configuration example of the typical optically transmitting system. As shown in FIG. 1, a plurality of client networks 1, 1, - - - are connected to optically transmitting apparatuses 2, 2, - - -. The optically transmitting apparatuses 2 are connected such that data can be communicated with each other through a network 3. The optically transmitting apparatuses 2, 2 - - - receive or transmit the optical signal through the client networks 1, 1, - - - by using the data sequence frame format, such as Giga-bit Ethernet (hereafter, referred to as GbE), 1-Giga-Fiber Channel (hereafter, referred to as 1GFC), 2-Giga-Fiber Channel (hereafter, referred to as 2GFC), ESCON (hereafter, referred to as ESCON) and the like.

Figure 2:
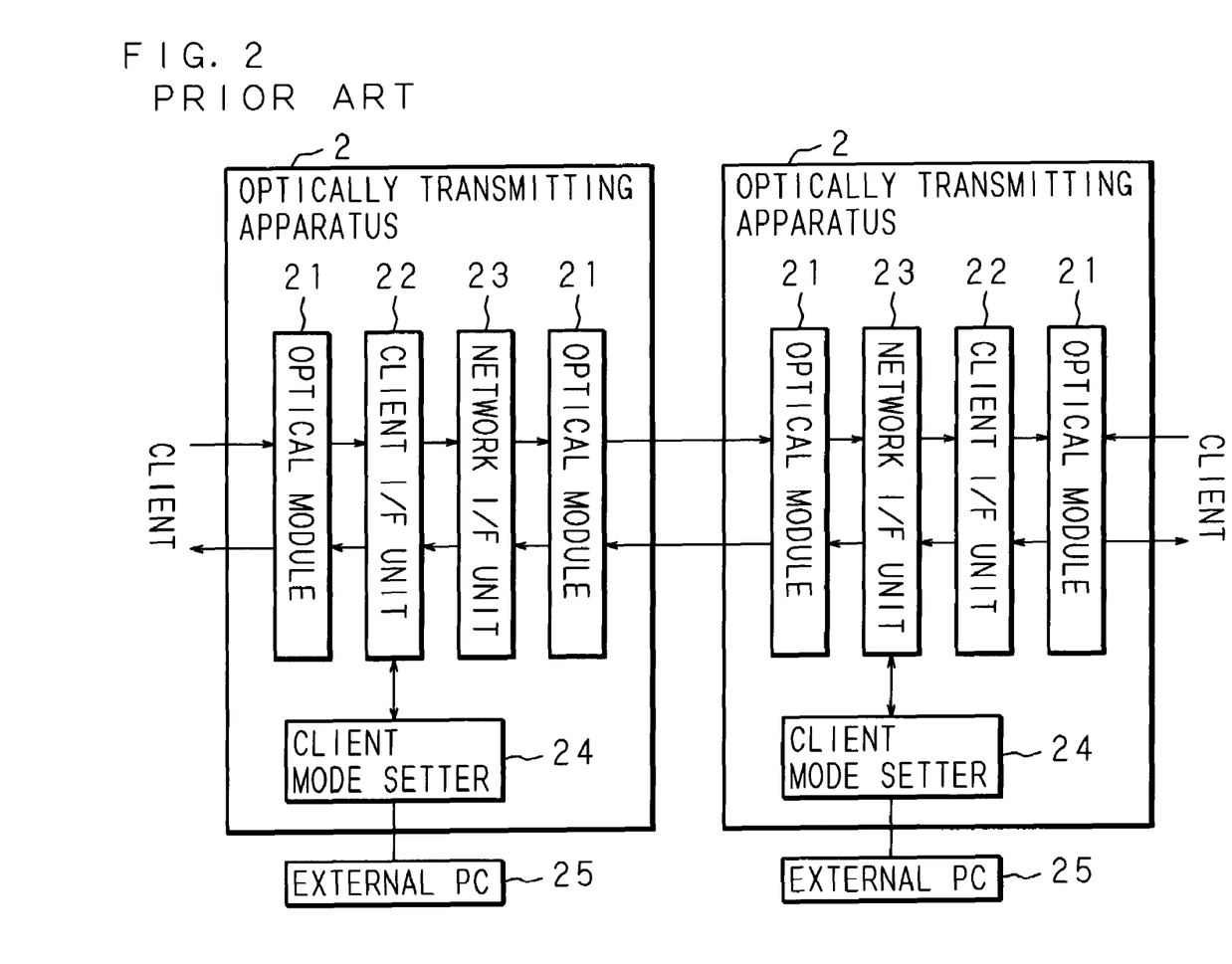
FIG. 2 is a block diagram showing a configuration example that a conventional optically transmitting apparatus is used as a receiver and a transmitter.

FIG. 2 is a block diagram showing the configuration example where the conventional optically transmitting apparatuses 2, 2 are used as a receiver and a transmitter. The optically transmitting apparatus 2 includes: an optical module 21 for converting an optical signal into an electric signal or converting the electric signal into the optical signal; a client I/F unit 22 for performing a predetermined process on a signal received from a client; a network I/F unit 23 for performing a predetermined process to transmit to and receive from the other optically transmitting apparatus 2 functioning as the transmitter; and a client mode setter 24 for setting to a mode corresponding to a frame format of the optical signal received from the client. The client mode setter 24 is connected through a communication line to an external PC 25 and sets to the mode corresponding to the received frame format before starting an optically transmitting process. That is, when the optical signal configured in accordance with any frame format is received, the setting of the client I/F unit 22 is changed through the client mode setter 24 so as to obtain the mode corresponding to the frame format. Consequently, it is possible to embody the optically transmitting apparatus that can correspond to a plurality of frame formats.

However, the above-mentioned conventional optically transmitting apparatus 2 was required to specify the frame format of the optical signal to be received before receiving the optical signal and then set to the mode corresponding to the specified frame format. Thus, there were problems that a pre-process for actually performing the optical transmission became complex and that a communication trouble caused by the setting mistake resulting from a human error and the like might be induced. In order to solve such problems, for example, through use of the protocol identification method (see to Japanese Patent Application Laid-Open No. 9-083562) there is a possibility to be able to provide an optically transmitting apparatus that can avoid the complex setting process by identifying the frame format in accordance with a header information of the received data and the like and then setting to a moderate mode.

BRIEF SUMMARY OF THE INVENTION

The present invention is proposed in view of such problems. It is therefore an object of the present invention to provide an optically transmitting apparatus, an optically transmitting system and an optically transmitting method, which even in a case that a data frame having an actual data in a state where a communication is established is not received, can identify a frame format of a received data and smoothly carry out an optical transmission.

In order to attain the above-mentioned object, an optically transmitting apparatus according to the first invention is characterized by including: means for receiving an optical signal which is configured in accordance with any one frame format among a plurality of frame formats and includes a clock signal and a data signal; means for performing an optical-electric/electric-optical conversion on the received optical signal; means for extracting the clock signal and the data signal, which correspond to the frame format, from the optical-electric converted signal; and means for generating a frame corresponding to the frame format, and then transmitting the optical signal to an external apparatus, in which said optically transmitting apparatus further comprises identifying means for correlating and storing an idle code indicative of a block where a data is not communicated and the frame format and then identifying the received frame format, wherein the identifying means comprises: means for reading the idle code from the extracted data signal; and means for identifying the frame format corresponding to the read idle code, and a transmitting process is executed in accordance with the identified frame format.

Also, the optically transmitting apparatus according to the second invention is characterized in that in the first invention, the identifying means comprises: means for storing an ordered set indicative of a control sign word peculiar to the frame format and/or a data sign word correlated to the control sign word and then reading the ordered set from the extracted data signal; and means for identifying the frame format corresponding to the read ordered set.

Also, an optically transmitting apparatus according to the third invention is characterized by including the identifying means for each frame format, in the first or second invention.

Also, an optically transmitting system according to the fourth invention is characterized in that a transmitter and a receiver are configured by using any one optically transmitting apparatus of the first to third invention, wherein even if one of a light transmitting unit or a light receiving unit of the receiver or transmitter is not operated, an optical transmission can be carried out in one direction.

Also, an optically transmitting method according to the fifth invention is characterized by: receiving an optical signal, which is configured in accordance with any one frame format among a plurality of frame formats and includes a clock signal and a data signal; performing an optical-electric conversion on the received optical signal; extracting the clock signal and the data signal, which correspond to the frame format, from the optical-electric converted signal; generating a frame corresponding to the frame format; and transmitting the optical signal to an external apparatus, wherein the optically transmitting method correlates and stores an idle code indicative of a block where a data is not communicated and the frame format, and reads the idle code from the extracted data signal, and identifies the frame format corresponding to the read idle code and then executes a transmitting process in accordance with the identified frame format.

Also, the optically transmitting method according to the sixth invention is characterized by storing the ordered set indicative of a control sign word peculiar to the frame format and/or a data sign word correlated to the control sign word, and reading the ordered set from the extracted data signal, and then identifying the frame format corresponding to the read ordered set, in the fifth invention.

The first invention and the fifth invention receive the optical signal that includes the clock signal and the data signal and is configured in accordance with any one frame format among the plurality of frame formats, perform the optical-electric conversion on the received optical signal, extract the clock signal and the data signal, which correspond to the frame format, from the optical-electric converted signal, and generate the frame corresponding to the frame format, and then transmit the optical signal to the external apparatus. Also, they correlate and store the idle code indicative of the block where the data is not communicated and the frame format, and then read the idle code from the extracted data signal. They identify the frame format corresponding to the read idle code and execute the transmitting process in accordance with the identified frame format. Consequently, by using the idle code transmitted in the block where the actual data is not transmitted as a key information, it is possible to identify the frame format, and it is possible to carry out the setting corresponding to the frame format in the state where the communication is established, and it is possible to carry out the smooth data transmission.

The second invention and the sixth invention store the ordered set indicative of the control sign word peculiar to the frame format and/or the data sign word correlated to the control sign word. Then, they read the ordered set from the extracted data signal and identify the frame format corresponding to the read ordered set. Consequently, it is possible to identify the frame format in accordance with the ordered set peculiar to the frame format. The use combined with the format identifying process based on the idle code can specify the frame format of the received data further accurately and can carry out the smooth data transmission.

The third invention has the plurality of means for identifying the frame formats, for each frame format. Consequently, it is possible to execute the comparing process for the plurality of frame formats with regard to one reception data in parallel, and it is possible to early identify the corresponding frame format.

In the fourth invention, the transmitter and the receiver are configured in the above-mentioned optically transmitting apparatus. Then, even if any one of the light transmitting unit or light receiving unit of the receiver or transmitter is not operated, the optical transmission can be executed from the receiver to the transmitter side, or in the opposite direction. Thus, even if a trouble occurs in any port, the data transmission/reception to/from at least one direction can be executed, which can attain the stable optical transmission.

According to the first invention and the fifth invention, by using the idle code transmitted in the block where the actual data is not transmitted as the key information, it is possible to identify the frame format, and the setting corresponding to the frame format in the state where the communication is established, thereby enabling the smooth data transmission.

According to the second invention and the sixth invention, the frame format can be identified in accordance with the ordered set peculiar to the frame format, and the use combined with the frame format identifying process based on the idle code can specify the frame format of the received data further accurately, and the smooth data transmission can be executed.

According to the third invention, the comparing process for the plurality of frame formats with regard to one reception data can be executed in parallel, which can early identify the corresponding frame format.

According to the fourth invention, even if the trouble occurs in any port, the data transmission/reception to/from at least one direction can be carried out, which enables the stable optical transmission.

The above and further objects and features of the invention will more fully be apparent from the following detailed description with accompanying drawings.

DETAILED DESCRIPTION OF THE INVENTION

In the above-mentioned conventional optically transmitting apparatus, there was the problem that the frame format could not be identified unless the content of the received data was analyzed after the reception of the optical signal. That is, even in the case that the communication was established, unless any data was received, the frame format could not be identified. Thus, a dummy data was required to be transmitted and received.

On the other hand, in the optically transmitting system, the idle code is always transmitted and received in the block where the data frame is not transmitted and received. Also, other than the data frame and the idle code, the ordered set is transmitted such as SOP (Lead of Packet) indicating the lead of the frame and EOP (End Of Packet) indicating the end and the like. Those idle code and ordered set are the data peculiar to the frame format.

The present invention is proposed in view of the foregoing problems. It is therefore the object of the present invention to provide the optically transmitting apparatus, the optically transmitting system and the optically transmitting method, which even in the case that the data frame containing the actual data in the state where the communication is established is not received, can identify the frame format of the received data and smoothly carry out the optical transmission.

First Embodiment

Figure 3:
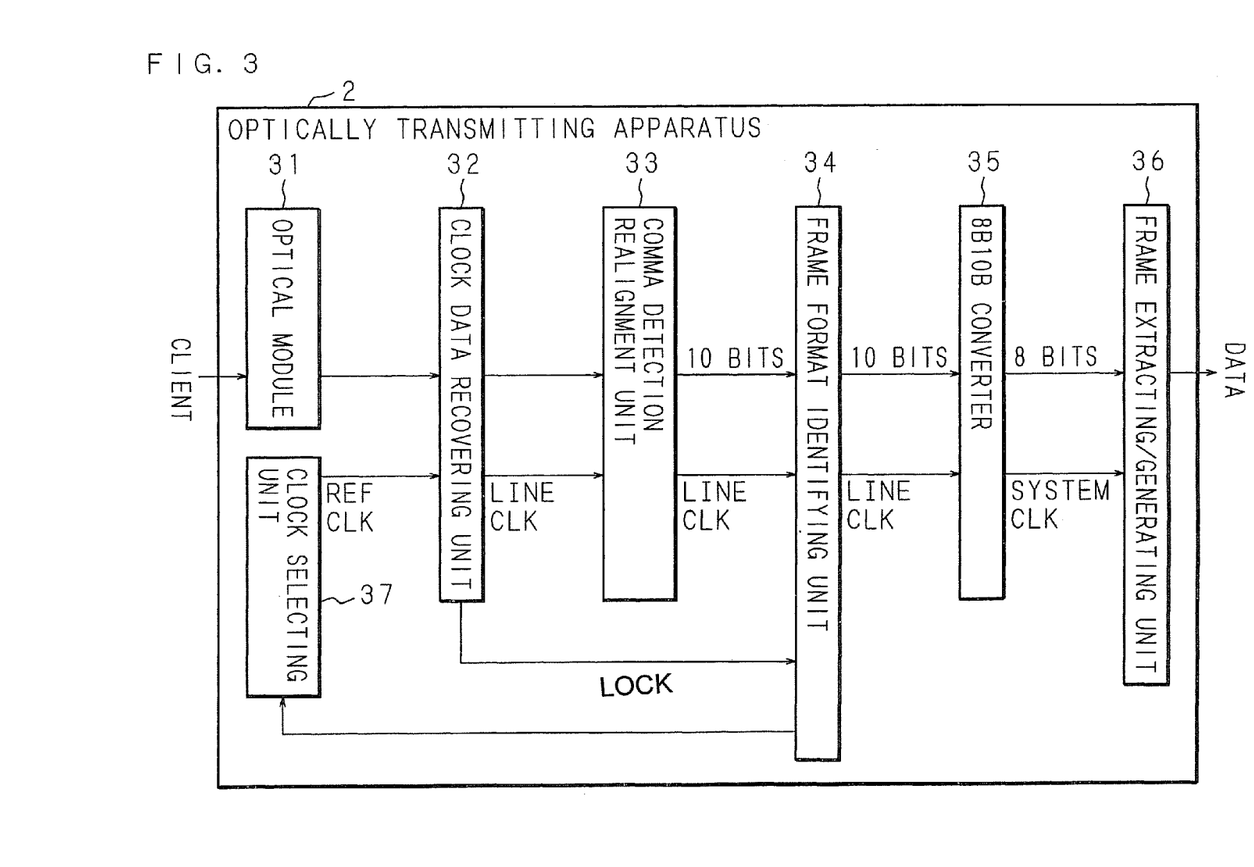
FIG. 3 is a block diagram showing a configuration of an optically transmitting apparatus according to a first embodiment of the present invention.

FIG. 3 is a block diagram showing the configuration of an optically transmitting apparatus 2 according to the first embodiment of the present invention. As shown in FIG. 3, the optically transmitting apparatus 2 according to the first embodiment of the present invention is at least provided with an optical module 31, a clock data recovering unit 32, a comma detection realignment unit 33, a frame format identifying unit 34, an 8B10B converter 35, a frame extracting/generating unit 36 and a clock selecting unit 37.

The optical module 31 receives an optical signal through client networks 1, 1, - - - and performs an optical-electric conversion and then outputs an electric signal. The clock data recovering unit 32 extracts a clock signal and a data signal, which correspond to the frame format, from the converted electric signal.

The comma detection realignment unit 33 detects a bit pattern exhibiting a comma and then rearranges bit rows. That is, even in a case that a data configured in accordance with any frame format is received, the comma is the bit pattern that does not exist in a serial bit row, and it is the bit pattern included in a special sign word (control sign word) K28.5 ruled in accordance with ANSI. Since the combination of the special sign word K28.5 and the data sign word is peculiar to the frame format, by detecting the comma, it is possible to specify the position of the special sign word K28.5 and then identify the frame format in accordance with the relation to a subsequent data sign word and the like.

Figure 4:
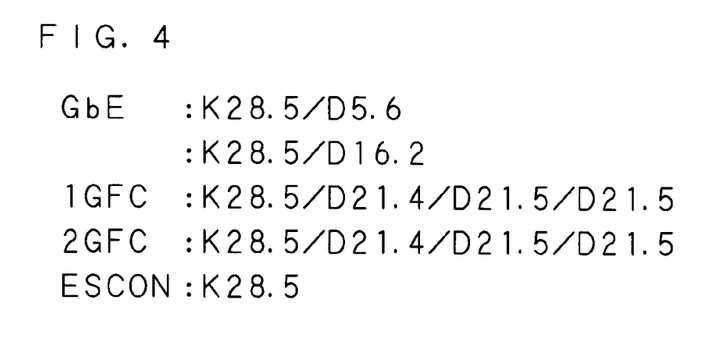
FIG. 4 is an exemplification view of an idle code for each frame format.

In the idle state, namely, even in the state that the communication is already established, an idle code peculiar to the frame format is transmitted in the block where the data frame containing an actual data is not transmitted. FIG. 4 is an exemplification view of the idle code for each frame format.

As shown in FIG. 4, in the idle state, in the GbE, D5.6 or D16.2 ruled in accordance with IEEE is transmitted after the special sign word K28.5. In the 1GFC or 2GFC, D21.4 and D21.5 which are ruled in accordance with the ANSI are transmitted at the order shown in FIG. 4 after the special sign word K28.5. Also, in the ESCON, although any data is not transmitted after the special sign word K28.5, the special sign word K28.5 is continuously transmitted in the idle state, and the special sign word K28.5 is never continuously transmitted in the other frame formats.

Figure 5:
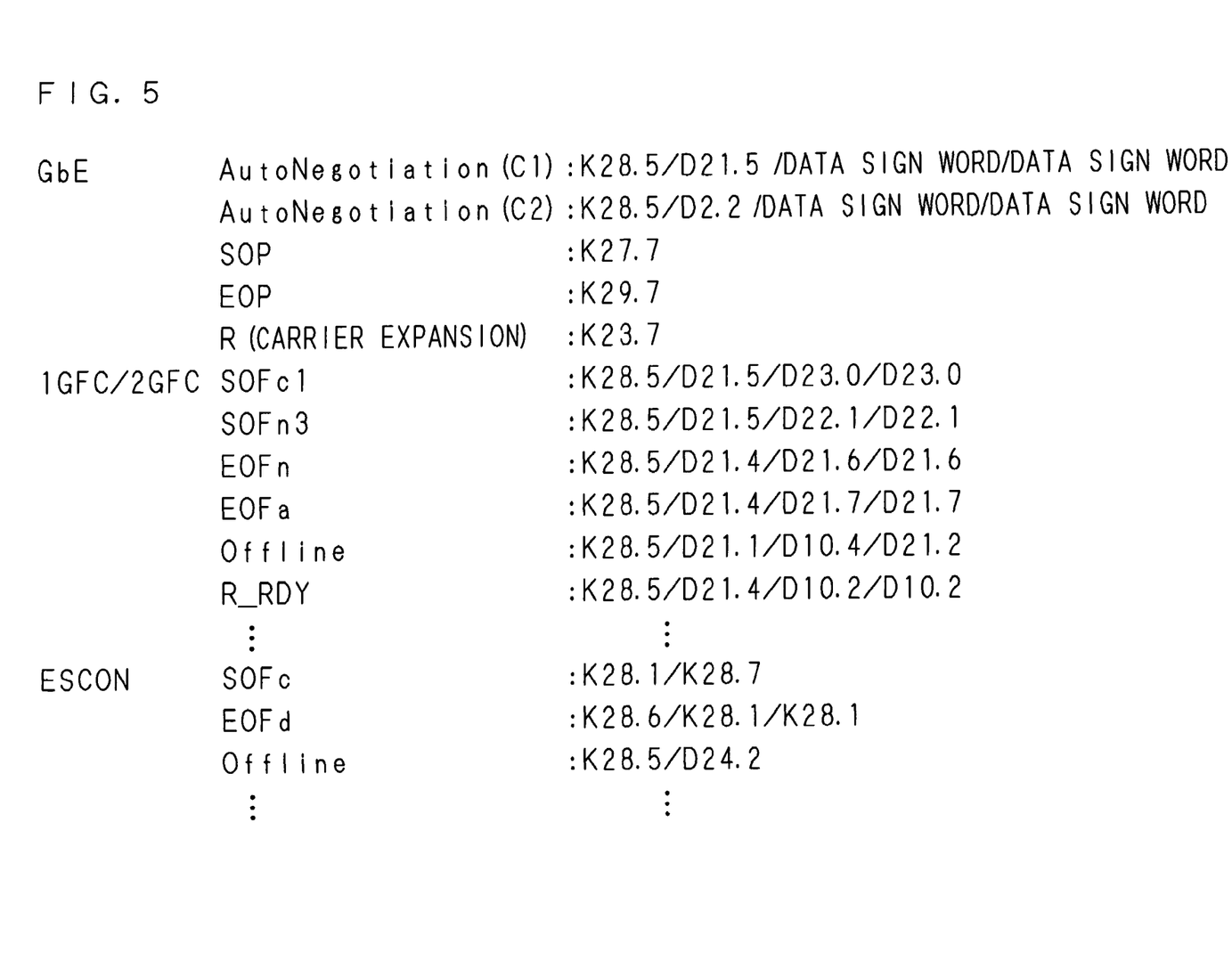
FIG. 5 is a view showing an example of an ordered set for each frame format.

So, the frame format identifying unit 34 reads the idle code transmitted in the idle state and compares with the idle pattern as shown in FIG. 4, which is stored for each frame format. FIG. 5 is a view showing the configuration example of the transmission data. As shown in FIG. 5, the actual data is transmitted in a data frame. In the block where the actual data is not transmitted, the idle code indicating the idle state is transmitted under the data configuration that is different for each frame format.

The frame format identifying unit 34 identifies the frame format of the transmission data in accordance with the compared result. However, the 1GFC and the 2GFC are equal in the idle pattern. Thus, this judges whether the frame format is the 1GFC or 2GFC, in accordance with the clock where it coincides with the idle pattern or does not coincide with the idle pattern, not only by comparing the idle code but also by switching a reference clock. That is, the frame format identifying unit 34, if judging that the frame format of the transmission data is the 1GFC or 2GFC in accordance with the inquiry of the idle code, transmits a switching instruction of the reference clock to the clock selecting unit 37 and specifies the 1GFC or 2GFC.

The above-mentioned process is carried out in accordance with a 10-bit data. Then, it is converted into an 8-bit data by the 8B10B converter 35 for the sake of the transmission to outside. The frame extracting/generating unit 36 extracts the frame of the identified frame format and generates the frame.

In order to improve the identification precision of the frame format identifying unit 34, it is preferred to use the special sign word, the special sign word and the data sign word and the like, in addition to the idle pattern, and read the ordered set transmitted to specify the data frame and then use for the identification of the frame format. FIG. 5 is a view showing one example of the ordered set of each frame format.

For example, if the frame format is the GbE, 'C1' and 'C2' are the ordered set of an auto-negotiation, and this carries out the integration as to whether it is a half-duplex communication or full-duplex communication, the adjustment of a transmission speed, and the like. Also, 'SOP' implies the lead of the frame, 'EOP' implies the end of the frame, and 'R' implies an expansion data, namely, a dummy data to carry out the adjustment so that the frame has an even-numbered byte, respectively.

Also, if the frame format is the 1GFC or 2GFC, 'SOFc1', 'SOFn3' and the like imply the lead of the frame, 'EOFn', 'EOFa' and the like imply the end of the frame, 'offline' implies the disconnection of a link, and 'R_RDY' implies the response indicating the reception of the frame, respectively.

Moreover, if the frame format is the ESCON, 'SOFc' implies the lead of the frame, 'EOFd' implies the end of the frame, and 'offline' implies the disconnection of the frame, respectively. The ordered set is not limited to the above-mentioned cases, and the ordered set corresponding to each frame format is stored.

The frame format identifying unit 34 inquires the ordered set that stores the received data, and for example, if judging that the ordered sets (C1, C2, SOP, EOP and R) of the GbE are received, judges that the frame format is the GbE. At the time of the auto-negotiation, the ordered sets C1, C2 are continuously received. However, C1 and C2 are not continuously received in a different frame format. Thus, it is possible to avoid them from being erroneously recognized as the different frame format. The other ordered sets are similar.

Also, if the frame format identifying unit 34 judges that the ordered set of the 1GFC or 2GFC (SOFc1, SOFn3, EOFn, EOFa, offline, R_RDY and the like) is received, the frame format identifying unit 34 judges that the frame format is the 1GFC or 2GFC. Since the ordered sets of the 1GFC and the 2GFC are equal, it is possible to judge any of them by switching the reference clock similarly to the above-mentioned method.

Also, if the frame format identifying unit 34 judges that the ordered set of the ESCON (SOFc, EOFd, offline and the like) is received, the frame format identifying unit 34 judges that the frame format is the ESCON. In this way, the use combined with the frame format identifying process based on the ordered set can improve the identification precision of the frame format.

As mentioned above, according to the first embodiment, the frame format can be identified in accordance with the idle code transmitted in the block where the actual data is not transmitted, and the setting corresponding to the frame format can be carried out in the state where the communication is established, and the smooth data transmission can be performed. Also, the use combined with the frame format identifying process based on the ordered set peculiar to the frame format and the frame format identifying process based on the idle code can specify the frame format of the received data further accurately.

Second Embodiment

Figure 6:
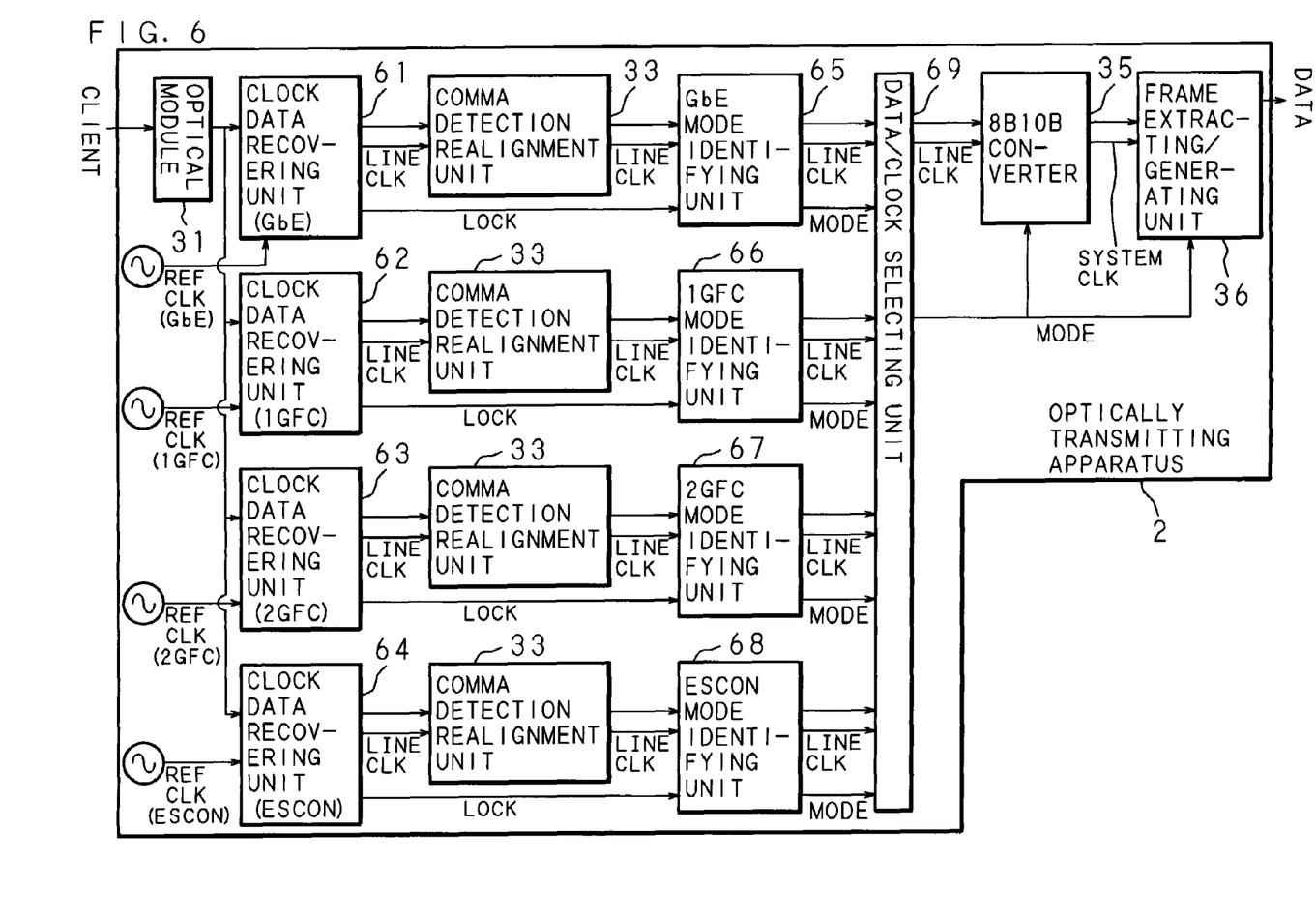
FIG. 6 is a block diagram showing a configuration of an optically transmitting apparatus according to a second embodiment of the present invention.

An optically transmitting apparatus 2 according to the second embodiment of the present invention will be described below in detail with reference to the drawings. FIG. 6 is a block diagram showing the configuration of the optically transmitting apparatus 2 according to the second embodiment of the present invention. It is noted that the same symbol is assigned to the portion having the same function as the optically transmitting apparatus 2 according to the first embodiment, and its detailed explanation is omitted. As shown in FIG. 6, the optically transmitting apparatus 2 according to the second embodiment of the present invention is at least provided with: the optical module 31; clock data recovering units 61, 62, 63 and 64 which are independent for each frame format; comma detection realignment units 33, 33, 33 and 33; mode identifying units 65, 66, 67 and 68 for each frame format; the 8B10B converter 35, the frame extracting/generating unit 36 and a data/clock selecting unit 69.

The optical module 31 receives the optical signal through the client networks 1, 1, - - - and performs the optical-electric conversion and outputs the electric signal. The outputted electric signal is transmitted to the clock data recovering units 61 to 64 which are independent for each frame format, and the clock data recovering units 61 to 64 extract the clock signals and the data signals which correspond to the frame formats, respectively, from the converted electric signal.

The comma detection realignment units 33, 33, 33 and 33 detect the bit pattern indicating the comma and then rearrange the bit rows. That is, the combination of the special sign word K28.5 and the data sign word is peculiar to the frame format. Thus, by detecting the comma, it is possible to specify the position of the special sign word K28.5 and then identify the frame format in accordance with the relation to the subsequent data sign word and the like.

The identification of the frame format is executed by inquiring the idle code peculiar to the frame format, similarly to the first embodiment. For example, in the idle state, in the GbE, D5.6 or D16.2 ruled in accordance with the IEEE is transmitted after the special sign word K28.5. In the 1GFC or 2GFC, D21.4 and D21.5 which are ruled in accordance with the ANSI are transmitted in the order shown in FIG. 4 after the special sign word K28.5. Also, in the ESCON, although any data is not transmitted after the special sign word K28.5, the special sign word K28.5 is continuously transmitted in the idle state, and the special sign word K28.5 is never continuously transmitted in the other frame formats.

So, the GbE mode identifying unit 65 reads the idle code transmitted in the idle state, compares with the idle code of the stored GbE, and in the coincident case, outputs a mode signal indicating that the frame format is the GbE. Similarly, the 1GFC mode identifying unit 66, the 2GFC mode identifying unit 67 and the ESCON mode identifying unit 68 read the idle codes transmitted in the idle state, and compare with the idle codes of the stored 1GFC (2GFC) and ESCON, and in the coincident case, output the mode signal indicating that the frame formats are the 1GFC, 2GFC and ESCON.

It is noted that similarly to the first embodiment, the 1GFC and the 2GFC are equal in the idle code. Thus, as for the discrimination between them, by inputting the reference clock corresponding to the 1GFC to the clock data recovering unit 62 and inputting the reference clock corresponding to the 2GFC to the clock data recovering unit 63, respectively, it is possible to output the fact of the frame format where the idle code is coincident as the mode signal. The clock/data selecting unit 69 specifies the frame format in accordance with the received mode signal and then transmits to the 8B10B converter 35 and the frame extracting/generating unit 36. The 8B10B converter 35 converts the 10-bit data into the 8-bit data, and the frame extracting/generating unit 36 extracts the frame of the specified frame format and then generates the frame.

Of course, in order to improve the identification precision of the frame format, similarly to the first embodiment, it is allowable to use the special sign word, the special sign word and the data sign word and the like, in addition to the idle pattern, and read the ordered set transmitted to specify the data frame and then use for the identification of the frame format. In this case, the GbE mode identifying unit 65, the 1GFC mode identifying unit 66, the 2GFC mode identifying unit 67 and the ESCON mode identifying unit 68 judge whether or not it is coincident with the ordered set of each frame format, similarly to the first embodiment, and the identification precision can be consequently improved.

As mentioned above, according to this second embodiment, the comparing processes for the plurality of frame formats with regard to one reception data can be carried out in parallel, and the corresponding frame format can be early identified.

Third Embodiment

Figure 7:
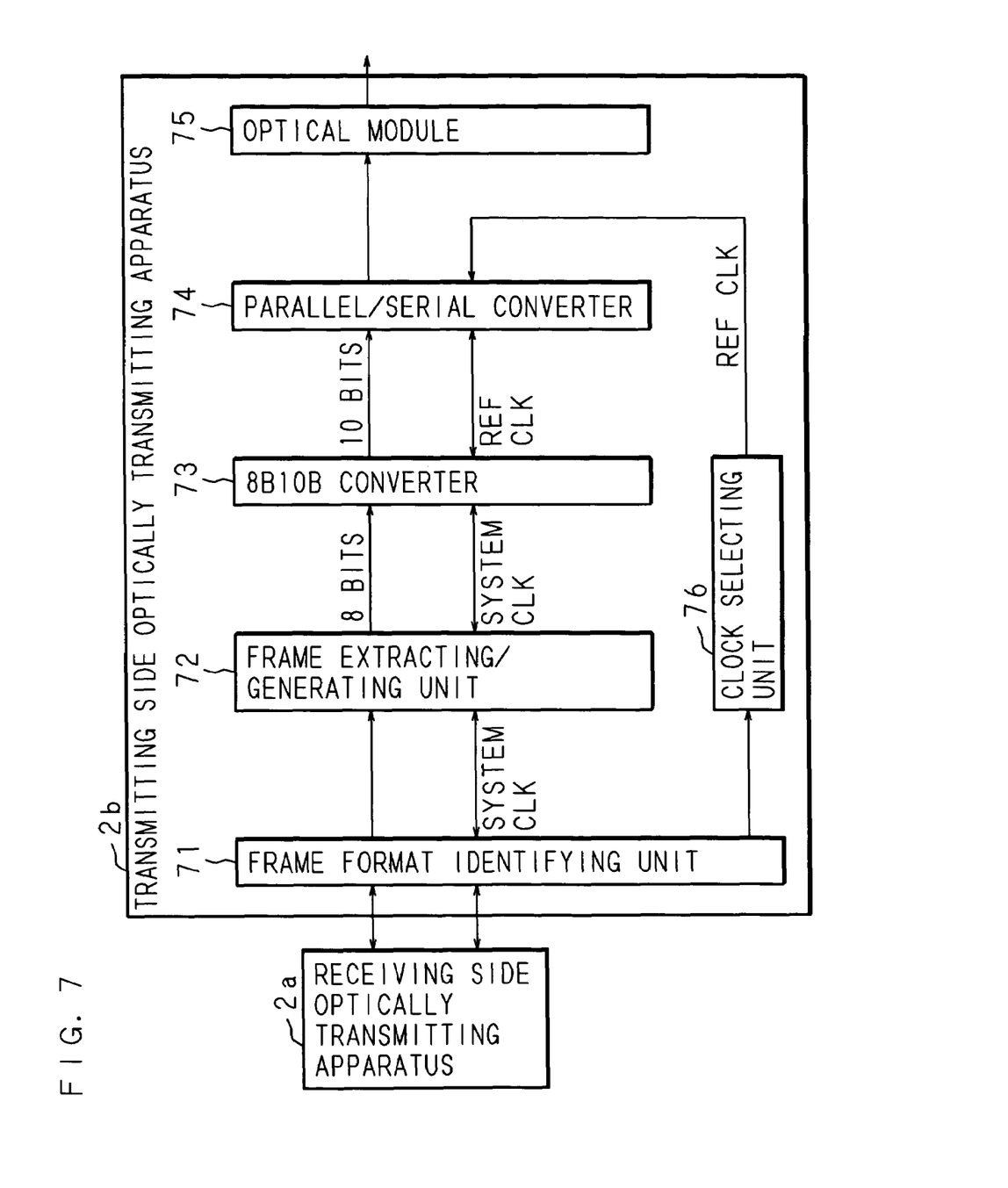
FIG. 7 is a block diagram showing a configuration of an optically transmitting system according to a third embodiment of the present invention.

An optically transmitting system according to the third embodiment of the present invention will be described below in detail with reference to the drawings. FIG. 7 is a block diagram showing the configuration of the optically transmitting system according to the third embodiment of the present invention. Further more, the same symbol is assigned to the portion having the same function as the optically transmitting apparatus 2 according to the first and second embodiments, and its detailed explanation is omitted. This third embodiment is characterized in that two apparatuses of a receiving side optically transmitting apparatus 2a and a transmitting side optically transmitting apparatus 2b are configured as one set and each optically transmitting apparatus independently identifies the frame format.

The configuration of the receiving side optically transmitting apparatus 2a according to the third embodiment is similar to that of the first embodiment. Thus, its detailed explanation is omitted. The transmitting side optically transmitting apparatus 2b according to the third embodiment is at least provided with a frame format identifying unit 71, a frame extracting/generating unit 72, an 8B10B converter 73, a parallel/serial converter 74 for converting a 10-bit parallel data into a one-bit serial data, an optical module 75 and a clock selecting unit 76.

The frame format identifying unit 71 reads the idle code transmitted in the idle state and compares with the idle pattern stored for each frame format. The frame format identifying unit 71 identifies the frame format of the transmission data in accordance with the compared result. However, the 1GFC and the 2GFC are equal in the idle pattern. Thus, not only by comparing the idle code but also by switching the reference clock, this judges the 1GFC or 2GFC in accordance with whether or not the clock coincides with the idle pattern. That is, the frame format identifying unit 71, if judging that the frame format of the transmission data is the 1GFC or 2GFC in accordance with the inquiry of the idle code, transmits the switching instruction of the reference clock to the clock selecting unit 76 and judges whether it is the 1GFC or 2GFC.

The frame extracting/generating unit 72 extracts the frame of the identified frame format and generates the frame. The 8B10B converter 73 converts the generated frame data into a 10-bit data, and the clock data recovering unit 32 generates the electric signal in accordance with the clock signal and the data signal, which correspond to the identified frame format. The optical module 75 carries out the electric-optical conversion from the electric signal into the optical signal and transmits the optical signal through the client networks 1, 1, - - - .

It is noted that similarly to the first embodiment, in order to improve the identification precision of the frame format identifying unit 71, it is preferred to use the special sign word, the special sign word and the data sign word and the like, in addition to the idle pattern, and read the ordered set transmitted to specify the data frame and then use for the identification of the frame format. For example, if the frame format is the GbE, 'C1' and 'C2' are the ordered set of the auto-negotiation, and this carries out the integration as to whether it is the half-duplex communication or full-duplex communication, the adjustment of the transmission speed, and the like. Also, 'SOP' implies the lead of the frame, 'EOP' implies the end of the frame, and 'R' implies the expansion data, namely, the dummy data to carry out the adjustment so that the frame has the even-numbered byte, respectively.

Also, if the frame format is the 1GFC or 2GFC, 'SOFc1', 'SOFn3' and the like imply the lead of the frame, 'EOFn', 'EOFa' and the like imply the end of the frame, 'offline' implies the disconnection of the link, and 'R_RDY' implies the response indicating the reception of the frame, respectively.

Moreover, if the frame format is the ESCON, 'SOFc' implies the lead of the frame, 'EOFd' implies the end of the frame, and 'offline' implies the disconnection of the frame, respectively. The ordered set is not limited to the above-mentioned cases, and the ordered set corresponding to each frame format is stored.

The frame format identifying unit 71 inquires the ordered set that stores the received data, and for example, if judging that the ordered sets (C1, C2, SOP, EOP and R) of the GbE are received, judges that the frame format is the GbE. At the time of the auto-negotiation, the ordered sets C1, C2 are continuously received. However, C1 and C2 are not continuously received in the different frame format. Thus, it is possible to avoid them from being erroneously recognized as the different frame format. The other ordered sets are also similar.

Also, if the frame format identifying unit 71 judges that the ordered set of the 1GFC or 2GFC (SOFc1, SOFn3, EOFn, EOFa, offline, R_RDY and the like) is received, the frame format identifying unit 34 judges that the frame format is the 1GFC or 2GFC. Since the ordered sets of the 1GFC and the 2GFC are equal, it is possible to judge any of them by switching the reference clock similarly to the above-mentioned method.

Also, if the frame format identifying unit 71 judges that the ordered set of the ESCON (SOFc, EOFd, offline and the like) is received, the frame format identifying unit 34 judges that the frame format is the ESCON. In this way, the use combined with the frame format identifying process based on the ordered set can improve the identification precision of the frame format.

It is noted that the receiving side optically transmitting apparatus 2a and the transmitting side optically transmitting apparatus 2b according to this third embodiment may include the clock data recovering unit, the comma detection realignment unit and the frame format identifying unit, independently for each frame format, similarly to the second embodiment. Consequently, the comparing processes for the plurality of frame formats with regard to one reception data can be carried out in parallel, and the corresponding frame format can be early identified.

As mentioned above, according to this third embodiment, the receiving side optically transmitting apparatus 2a and the transmitting side optically transmitting apparatus 2b can independently identify the frame format. Then, even if a trouble is induced in a port of any of the apparatuses, namely, a light receiving unit or light transmitting unit, a data transmission/reception to/from at least one direction can be carried out, which can attain the stable optical transmission.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bound of the claims, or equivalence of such metes and bounds thereof are therefore intended to be embraced by the claims.

What is claimed is:

1. An optically transmitting apparatus comprising:
   means for receiving an optical signal that is configured in accordance with any one frame format among a plurality of frame formats and includes at least a clock signal and a data signal;
   means for performing an optical-electric/electric-optical conversion on the received optical signal;
   means for extracting the clock signal and the data signal, which correspond to the frame format, from the optical-electric converted signal; and
   means for generating a frame corresponding to the frame format,
   in which said optically transmitting apparatus transmits the optical signal to an external apparatus and further comprises:
   identifying means for correlating and storing an idle code indicative of a block where a data is not communicated and the frame format, and then identifying the received frame format, wherein the identifying means comprises:
   means for reading the idle code from extracted said data signal; and
   means for identifying the frame format corresponding to the read idle code, in which a transmitting process is executed in accordance with the identified frame format.

2. The optically transmitting apparatus according to claim 1, wherein the identifying means comprises:
   means for storing an ordered set indicative of a control sign word peculiar to the frame format and/or a data sign word correlated to the control sign word;
   means for reading the ordered set from extracted said data signal; and
   means for identifying the frame format corresponding to the read ordered set.

3. The optically transmitting apparatus according to claim 2, comprising a plurality of said identifying means for each frame format.

4. An optically transmitting system which comprises a transmitter and a receiver that comprise the optically transmitting apparatus according to claim 3, wherein even if one of a light transmitting unit or a light receiving unit of said receiver or transmitter is not operated, an optical transmission can be carried out in one direction.

5. An optically transmitting system which comprises a transmitter and a receiver that comprise the optically transmitting apparatus according to claim 2, wherein even if one of a light transmitting unit or a light receiving unit of said receiver or transmitter is not operated, an optical transmission can be carried out in one direction.

6. The optically transmitting apparatus according to claim 1, comprising a plurality of said identifying means for each frame format.

7. An optically transmitting system which comprises a transmitter and a receiver that comprise the optically transmitting apparatus according to claim 6, wherein even if one of a light transmitting unit or a light receiving unit of said receiver or transmitter is not operated, an optical transmission can be carried out in one direction.

8. An optically transmitting system which comprises a transmitter and a receiver that comprise the optically transmitting apparatus according to claim 1, wherein even if one of a light transmitting unit or a light receiving unit of said receiver or transmitter is not operated, an optical transmission can be carried out in one direction.

9. An optically transmitting apparatus comprising:
an optical module which receives an optical signal configured in accordance with any one frame format among a plurality of frame formats and includes at least a clock signal and a data signal, and which converts the received optical signal into an electric signal;
an extracting unit which extracts the clock signal and the data signal from the electric signal;
a frame format identifying unit which reads an idle code indicative of a block where a data is not communicated from the extracted data signal, and which identifies said any one frame format from the read idle code; and
a frame generating unit which generates a frame corresponding to the identified frame format.

10. The optically transmitting apparatus according to claim 9, wherein:
the frame format identifying unit stores an ordered set indicative of a control sign word peculiar to a frame format and/or a data sign word correlated to the control sign word, reads the ordered set from the extracted data signal and identifies the frame format corresponding to the read ordered set.

11. An optically transmitting system which comprises a transmitter and a receiver that comprise the optically transmitting apparatus according to claim 10, wherein even if one of a light transmitting unit or a light receiving unit of said receiver or transmitter is not operated, an optical transmission can be carried out in one direction.

12. An optically transmitting system which comprises a transmitter and a receiver that comprise the optically transmitting apparatus according to claim 9, wherein even if one of a light transmitting unit or a light receiving unit of said receiver or transmitter is not operated, an optical transmission can be carried out in one direction.

13. An optically transmitting method comprising the steps of:
receiving an optical signal which is configured in accordance with any one frame format among a plurality of frame formats and includes a clock signal and a data signal;
performing an optical-electric/electric-optical conversion on the received optical signal;
extracting the clock signal and the data signal, which correspond to the frame format, from the optical-electric converted signal;
generating a frame corresponding to the frame format; and
transmitting the optical signal to an external apparatus,
wherein the method further comprises the steps of:
correlating and storing an idle code indicative of a block where a data is not communicated and the frame format;
reading an idle code from extracted said data signal;
identifying the frame format corresponding to the read idle code; and
executing a transmitting process in accordance with the identified frame format.

14. The optically transmitting method according to claim 13, comprising the steps of:
storing an ordered set indicative of a control sign word peculiar to the frame format and/or a data sign word correlated to the control sign word;
reading the ordered set from extracted said data signal; and
identifying the frame format corresponding to the read ordered set.

15. An method comprising:
receiving an optical signal configured in accordance with a respective frame format and including at least a clock signal and a data signal;
converting the received optical signal into an electric signal;
extracting the data signal from the electric signal;
reading an idle code indicative of a block where a data is not communicated from the extracted data signal;
identifying said respective frame format from the read idle code;
generating a frame corresponding to the identified frame format and including data from the extracted data signal; and
transmitting the generated frame.

* * * * *